(No Model.)
C. W. BENNET.
HORSE DETACHER.
No. 248,250. Patented Oct. 11, 1881.
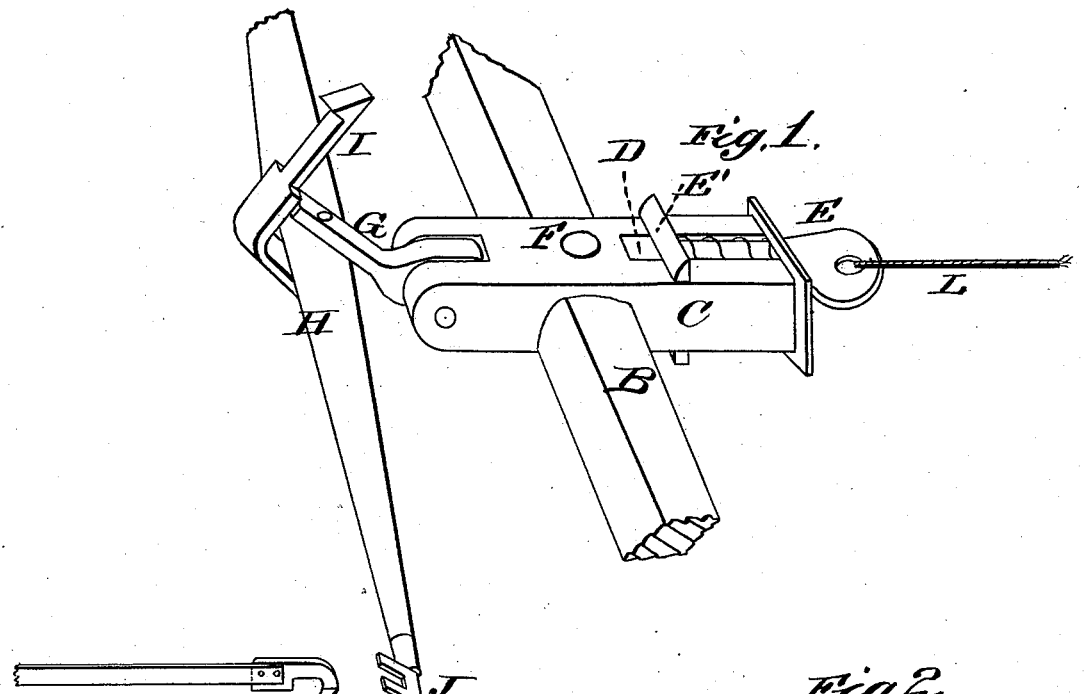
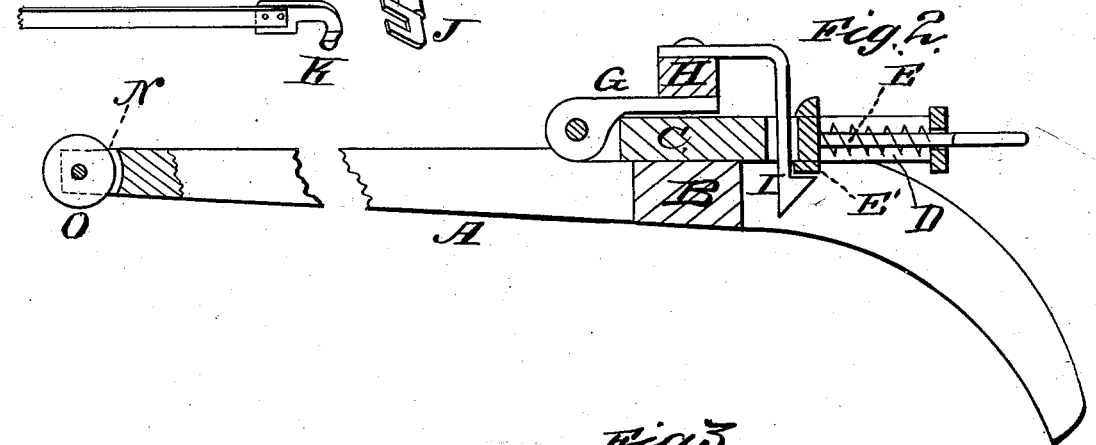
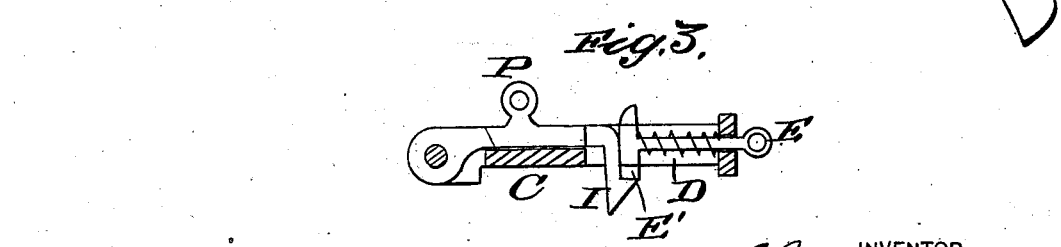
WITNESSES
E. H. Bates
Philip C. Masi.
INVENTOR
Chas. W. Bennet
by Anderson & Smith
his ATTORNEYS
N. PETERS. Photo-Lithographer, Washington, D. C.

UNITED STATES PATENT OFFICE.

CHARLES W. BENNET, OF MANCHESTER, ASSIGNOR TO JOHN F. HORNBERGER AND SAMUEL W. WARDS, BOTH OF LAWRENCEBURG, INDIANA.

HORSE-DETACHER.

SPECIFICATION forming part of Letters Patent No. 248,250, dated October 11, 1881.

Application filed August 27, 1881. (No model.)

*To all whom it may concern:*

Be it known that I, CHAS. W. BENNET, a citizen of the United States, resident of Manchester, in the county of Dearborn and State of Indiana, have invented a new and valuable Improvement in Horse-Detachers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective view of my invention. Fig. 2 is a sectional view. Fig. 3 is a detail sectional view.

This invention has relation to horse-detachers; and it consists in the novel construction and arrangement of a single-tree provided with a catch and connected to a slotted casting by a pivoted arm in such a manner that the catch may be passed downwardly through the slot in the casting and be secured by a spring-slide and released by withdrawing the same, as will be hereinafter fully described, and pointed out in the claims.

Referring by letter to the accompanying drawings, A designates the thills, and B the cross-bar, to which a casting, C, having a slot, D, and a rod, E, and slide E', provided with a spring to govern the slide, is secured by a screw or bolt, F, or in any other suitable manner.

A pivoted arm, G, extends forward from the casting C and is bolted to the single-tree H, as shown. A catch, I, is bolted to the central portion of the single-tree H, in line with the arm G, cut at right angles thereto, extending downwardly.

Slotted clips J are provided at the ends of the single-tree to engage the hooks K on the traces. The rod E has an eye at its rear end, and a rope, L, is connected thereto, to be operated by the driver.

The single-tree is turned over the cross-bar and the catch passed down in front of the slide, which engages and holds the single-tree in place, the slotted clips being in a vertical position, and the hooks engaged therewith until it may become necessary to detach the horse from the vehicle to prevent accident, at which time the rope or strap may be pulled to release the catch from the slide, and the single-tree will be turned by the horse and the hooks released from the clips.

The ends of the thills are provided with sockets N, provided, with a rubber or other wheel, O, to prevent the vehicle from coming to a too sudden stop when the thills drop to the ground. The wheels will permit the vehicle to move for the necessary distance without a shock when the thills fall.

By the employment of a dead-eye, P, connected to the catch, the device may be applied to canal-boats to detach the rope when necessary.

Having thus fully described my invention, what I claim as new, and desire to secure by Letters Patent, is—

1. In a horse-detacher, the combination, with the cross-bar of the thills of a vehicle having a slotted casting provided with a retractile slide, of a single-tree pivoted to said casting, and having a catch to engage the slide and slotted tug-clips at its ends, substantially as and for the purposes specified.

2. In a horse-detacher, the thills A, provided at their points with the sockets N, carrying the wheels O, substantially as and for the purposes set forth.

In testimony that I claim the above I have hereunto subscribed my name in the presence of two witnesses.

CHARLES W. BENNET.

Witnesses:
GIDEON RENNER,
EUGENE A. DUMONT.